(12) United States Patent
Ooki

(10) Patent No.: US 7,430,006 B2
(45) Date of Patent: *Sep. 30, 2008

(54) CHARGE TRANSFER DEVICE AND A DRIVING METHOD THEREOF AND A DRIVING METHOD FOR SOLID-STATE IMAGE SENSING DEVICE

(75) Inventor: Hiroaki Ooki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/316,015

(22) Filed: Dec. 22, 2005

(65) Prior Publication Data

US 2006/0098109 A1    May 11, 2006

Related U.S. Application Data

(63) Continuation of application No. 09/325,636, filed on Jun. 4, 1999, now Pat. No. 6,980,245.

(30) Foreign Application Priority Data

Jun. 5, 1998    (JP) .................................. 10-156944

(51) Int. Cl.
    H04N 5/335    (2006.01)
(52) U.S. Cl. ..................................... 348/311
(58) Field of Classification Search ................ 348/311, 348/312, 313, 314, 315, 317, 319, 320, 321, 348/322, 323, 324, 294, 297, 303, 304, 305
    See application file for complete search history.

(56) References Cited

U.S. PATENT DOCUMENTS 5,239,380 A    8/1993    Yokoyama
5,757,427 A    5/1998    Miyaguchi
5,867,212 A    2/1999    Toma et al.
6,075,565 A    6/2000    Tanaka et al.
6,441,851 B1    8/2002    Yonemoto
6,515,703 B1    2/2003    Suzuki et al.
6,980,245 B1 *    12/2005    Ooki .......................... 348/311

FOREIGN PATENT DOCUMENTS

JP    04-207874    7/1992
JP    11-261901    4/1999

* cited by examiner

Primary Examiner—Tuan V Ho
(74) Attorney, Agent, or Firm—Robert J. Depke; Rockey, Depke & Lyons, LLC

(57)    ABSTRACT

A driving method for a solid-state image sensing device having a plurality of sensor portions being disposed two-dimensionally in a horizontal and a vertical directions, and a vertical charge transfer portion being disposed between said plurality of sensor portions and being provided with transfer electrodes of a plurality of systems disposed along its disposed direction, including the steps of; selectively applying high level driving pulses to the transfer electrodes of said plurality of systems in respective sectional periods in a vertical transfer period, and transferring the signal charges read out from said plurality of sensor portions in the vertical direction, wherein a sectional period in a vertical transfer period, in which the number of systems of the transfer electrodes to be applied with high level driving pulses becomes minimum is set longer than that of the other sectional periods. It is thus made possible to increase the handling charge quantity in the vertical charge transfer portion without changing time for transfer in the vertical transfer period.

20 Claims, 3 Drawing Sheets

US 7,430,006 B2

CHARGE TRANSFER DEVICE AND A DRIVING METHOD THEREOF AND A DRIVING METHOD FOR SOLID-STATE IMAGE SENSING DEVICE

The present application is a continuation of U.S. application Ser. No. 09/325,636, filed Jun. 4, 1999 now U.S. Pat. No. 6,980,245, which claims priority to Japanese Patent Application No. JP10-156944, filed Jun. 5, 1998. The present application claims priority to these previously filed applications. The subject matter of application Ser. No. 09/325,636 is incorporated herein by reference.

BACKGROUND OF THE INVENTION

The present invention relates to a charge transfer device, such as a CCD and a driving method thereof, and a driving method for a solid-state image sensing device, in particular, it relates to a driving method for CCD solid-state image sensing devices of an IT (Inter-line Transfer) type.

In general, in a CCD solid-state image sensing device of the IT type, when signal charges are transferred, for example, by a vertical charge transfer portion (vertical shift register) having transfer electrodes of four systems, the transfer of signal charges for one line is performed in a horizontal blanking interval, and normally it is performed in a vertical transfer period being composed of eight sectional periods. In respective sectional periods, each one of four transfer electrodes is selectively applied with a high level driving pulse to control a depth of a potential well which is formed under each one of transfer the electrodes of respective systems, and the transfer of signal charges in a vertical direction is realized with the moves of signal charges described in the above. In a case where a read-out method in the interlaced scanning is changed to the read-out method in which all pixels are independently read out, or in a case where a constitution of a CCD solid-state sensing device responds to an electronic zoom lens or correction of blur caused by an unintentional hand move, it is needed to perform the charge transfer in the vertical charge transfer portion at a higher speed than usual.

However, when the transfer speed in the vertical charge transfer portion is made faster, with an increase in the transfer speed, the period of time for accumulating the charges in the vertical charge transfer portion is made shorter. Then the quantity of charges handled in the vertical charge transfer portion is decreased, and there is a fear that the transfer efficiency is lowered. In particular, for a CCD area sensor, there is a tendency that an increase in the number of pixels is demanded to realize high quality images in both a moving picture and a still picture. It is therefore necessary to take measures to such demands as the independent read-out of all pixels, or the improvement in techniques for an electronic zoom lens or correction of blur caused by an unintentional hand move, following to the upward tendency of requiring the increase in the number of pixels. Therefore, it looks inevitable that the transfer speed in the vertical charge transfer portion will continue to go up, so that it is desired to find an effective measure to suppress the decrease in the handling charge quantity in the vertical charge transfer portion.

SUMMARY OF THE INVENTION

The object of the present invention is to solve the aforementioned problems by providing a charge transfer device and a driving method thereof and a driving method for a solid-state image sensing device, more particularly, by providing a driving method for a solid-state image sensing device being able to suppress the decrease in the handling quantity of electric charges to the utmost when transferring signal charges at a high speed in the vertical charge transfer portion.

In order to achieve the object described in the above, according to an aspect of the present invention, there is provided A driving method for a solid-state image sensing device having a plurality of sensor portions being disposed two-dimensionally in a horizontal and a vertical directions, and a vertical charge transfer portion being disposed between the plurality of sensor portions and being provided with transfer electrodes of a plurality of systems disposed along its disposed direction, including the steps of; selectively applying high level driving pulses to the transfer electrodes of the plurality of systems in respective sectional periods in a vertical transfer period, and transferring the signal charges read out from the plurality of sensor portions in the vertical direction, wherein a sectional period in a vertical transfer period, in which the number of systems of the transfer electrodes to be applied with high level driving pulses becomes minimum is set longer than that of the other sectional periods.

According to another aspect of the present invention, there is provided a driving method for a charge transfer device having a charge transfer portion being formed of transfer electrodes of a plurality of systems disposed in the charge transfer direction, comprising the steps of; selectively applying a high level driving pulse to transfer electrodes of the plurality of systems in respective sectional periods in a transfer period, and transferring signal charges in a charge transfer portion, wherein a sectional period in the transfer period, in which the number of systems of the transfer electrodes to be applied with high level driving pulses becomes minimum are set longer than that of the other sectional periods.

According to a further aspect of the present invention, there is provided a charge transfer device having a charge transfer portion being formed of transfer electrodes of a plurality of systems disposed in the charge transfer direction; wherein high level driving pulses are applied to the transfer electrodes of the plurality of systems in respective sectional periods in a vertical transfer period, signal charges in a charge transfer portion are transferred, and a sectional period in a vertical transfer period, in which the number of systems of the transfer electrodes to be applied with high level driving pulses becomes minimum is set longer than that of the other sectional periods.

As described in the above, according to the present invention, it is made possible to increase the handling charge quantity in the vertical charge transfer portion without changing time for transfer in the vertical transfer period, so that in a case where signal charges are transferred at a high speed in the vertical charge transfer portion, for example, in a case of response to the read-out of all pixels being output independently, to the improvement of techniques in an electronic zoom lens or the correction of blur caused by an unintentional hand move, or to an increase in the number of stages in the vertical transfer, it is made possible to suppress the decrease in the handling charge quantity to the utmost.

DESCRIPTION OF THE PREFERRED EMBODIMENT

An explanation of embodiments of the present invention will be given in detail with reference to the drawings as follows.

Figure 1:
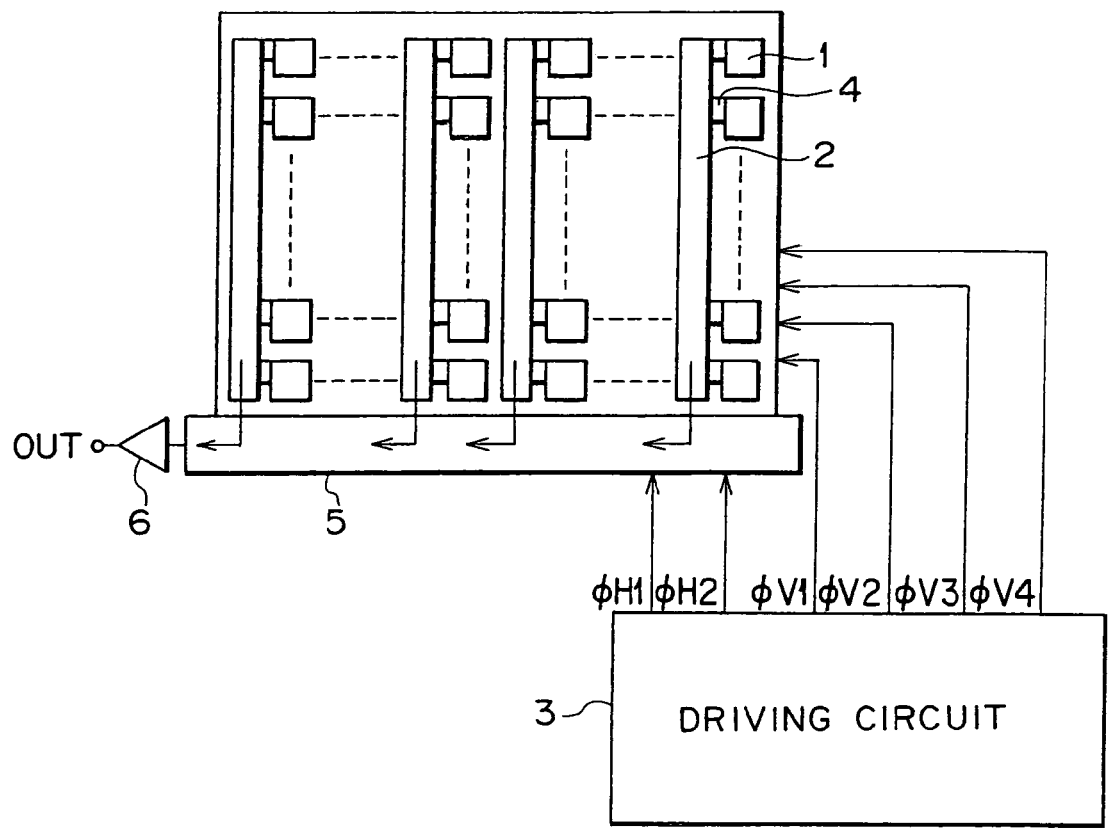
FIG. 1 is a schematic view showing the constitution of a CCD area sensor of an IT type and its driving system.

FIG. 1 shows a schematic view illustrating the constitution of a CCD area sensor of an IT type and its driving system. In the figure, a sensor portion 1 is formed of namely, photodiodes being disposed two-dimensionally in a horizontal and a vertical directions. Each sensor portion 1 converts the incident light supplied thereto to signal charges having the quantity corresponding to the light quantity and accumulates them. Plural bars of vertical charge transfer portions 2 are disposed in the vertical direction between respective sensor portions 1. Each vertical transfer portion 2 is formed of a CCD (Charge Coupled Device), and the transfer electrodes of four systems are disposed along its disposed direction. These vertical charge transfer portions 2 are driven by vertical driving pulses of 4-phase from $\phi V1$ through $\phi V4$, supplied from a driving circuit 3, and in a part of the vertical blanking interval, it transfers the signal charges read out from respective sensor portions 1 through the read-out gate portion 4.

Further on an end side of respective vertical charge transfer portions 2, there is provided a horizontal charge transfer portion 5 in the orthogonal direction to the above, that is, in the horizontal direction thereof. The horizontal charge transfer portion 5 is driven by horizontal driving pulses $\phi H1$ and $\phi H2$ of 2-phase supplied from the driving circuit 3, for transferring the signal charges supplied from the vertical charge transfer portions 2 in the horizontal direction for a specific period of time in a horizontal scanning interval, for example, during a horizontal blanking interval. On the output side of the horizontal charge transfer portion 5 (that is, the charge transferring direction) there is provided a charge detection portion 6 formed of an FDA (Floating Diffusion Amplifier), for example, for detecting signal charges transferred in the horizontal direction and converting them into signal voltages.

Figure 2:
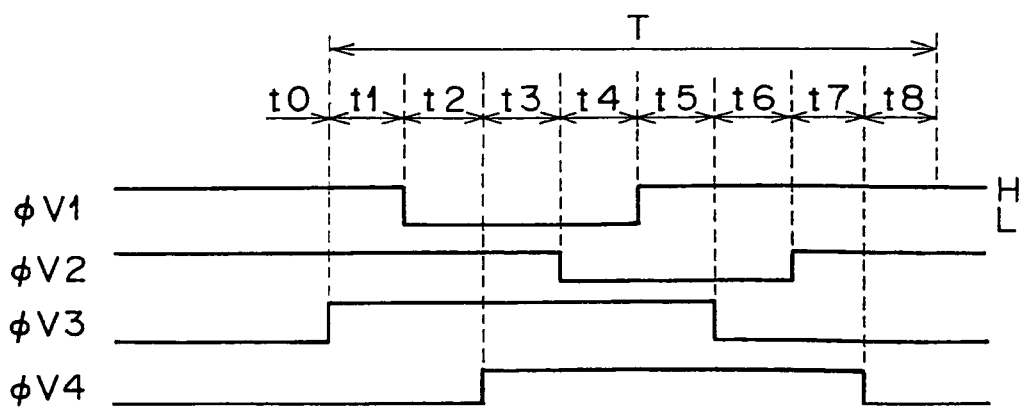
FIG. 2 shows a timing chart during a vertical transfer in the case of 4-phase drive which is a subject of comparison with the present invention.
Figure 3:
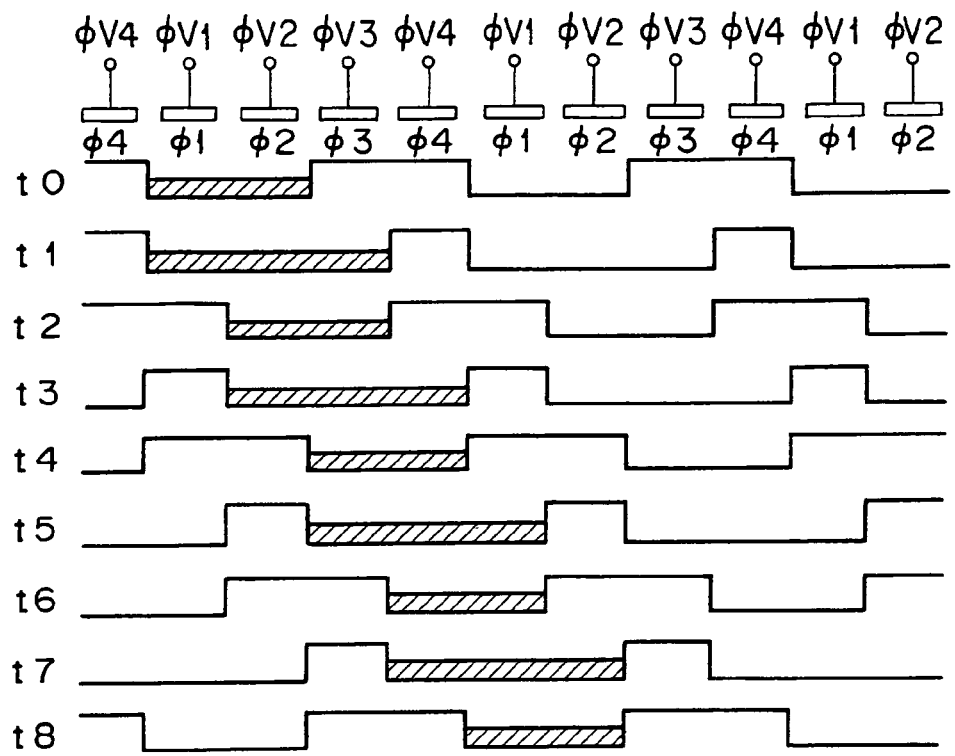
FIG. 3 shows a conceptual figure illustrating the transfer of signal charges during a vertical transfer in the case of 4-phase drive.

Next, in FIG. 2, the timing chart during a vertical transfer in the case of 4-phase drive is shown, and in FIG. 3, the transfer image of signal charges corresponding to the above as a subject of comparison with the driving method of a solid-state image sensing device according to the present invention. In this place, a case where it is assumed that respective vertical driving pulses of 4-phase, $\phi V1$ to $\phi V4$ may take two values, a high level (H) or a low level (L), and the transfer of signal charges for one line is performed in a vertical transfer period being divided into eight sections, from t1 through t8, will be explained in citing as an example. In FIG. 3, it is assumed that the vertical driving pulses $\phi V1$, $\phi V2$, $\phi V3$ and $\phi V4$ are applied by the driving circuit 3 to the corresponding transfer electrodes $\phi 1$, $\phi 2$, $\phi 3$ and $\phi 4$ of 4 systems in the vertical charge transfer portion 2.

In the sectional period to, before the vertical transfer is started, since the $\phi V1$ and the $\phi V2$ are kept in a high level, deep potential wells are formed under the transfer electrodes $\phi 1$ and $\phi 2$, allowing signal charges to be accumulated in these wells, and in this state, a vertical transfer period (from t1 through t8) is started.

In the sectional period t1, when $\phi V3$ is turned to a high level, deep potential wells are formed spreading over the transfer electrodes $\phi 1$, $\phi 2$ and $\phi 3$, and signal charges are accumulated under these transfer electrodes $\phi 1$, $\phi 2$ and $\phi 3$.

Next, in the sectional period t2, when the $\phi V1$ is turned to a low level, the potential well under the transfer electrode $\phi 1$ becomes shallow, so that signal charges are accumulated under the transfer electrodes $\phi 2$ and $\phi 3$.

In the next step, in the sectional period t3, when the $\phi V4$ is turned to a high level, deep potential wells are formed spreading over the transfer electrodes $\phi 2$, $\phi 3$ and $\phi 4$, so that signal charges are accumulated under these transfer electrodes $\phi 2$, $\phi 3$ and $\phi 4$.

Following to the sectional period t3, in the sectional period t4, when the $\phi V2$ is turned to a low level, the potential well under the transfer electrode $\phi 2$ becomes shallow, so that signal charges are accumulated under the transfer electrodes $\phi 3$ and $\phi 4$.

In the next step, in the sectional period t5, when the $\phi V1$ is turned to a high level, deep potential wells are formed spreading over the transfer electrodes $\phi 3$, $\phi 4$ and $\phi 1$, so that signal charges are accumulated under these transfer electrodes $\phi 3$, $\phi 4$ and $\phi 1$.

In the next step, in the sectional period t6, when $\phi V3$ is turned to a low level, the potential well under the transfer electrode $\phi 3$ becomes shallow, so that signal charges are accumulated under the transfer electrodes $\phi 4$ and $\phi 1$.

Incidentally, in the sectional period t7, when the $\phi V2$ is turned to a high level, deep potential wells are formed spreading over the transfer electrodes $\phi 4$, $\phi 1$ and $\phi 2$, so that signal charges are accumulated under these transfer electrodes $\phi 4$, $\phi 1$ and $\phi 2$.

In the last step, in the sectional period t8, when the $\phi V4$ is turned to a low level, the potential well under the transfer electrode $\phi 4$ becomes shallow, so that signal charges are accumulated under the transfer electrodes $\phi 1$ and $\phi 2$.

After taking above steps, the signal charges for one line in the vertical charge transfer portion 2 are transferred in a vertical direction.

In order to raise the transfer speed in the vertical charge transfer portion 2, it is necessary to shorten the transfer time T, the total of the above-mentioned eight sectional periods in a vertical transfer period. In such a case, in the driving method shown in FIG. 2, in each sectional period from t1 through t8 in a vertical transfer period, the transfer time per sectional period is made equal, so that when the transfer time for one line is shortened, naturally the sectional transfer period is also shortened.

At the same time, there is a tendency that the handling charge quantity in the vertical charge transfer portion 2 decreases with the shortening of the transfer time per sectional period.

Figure 4:
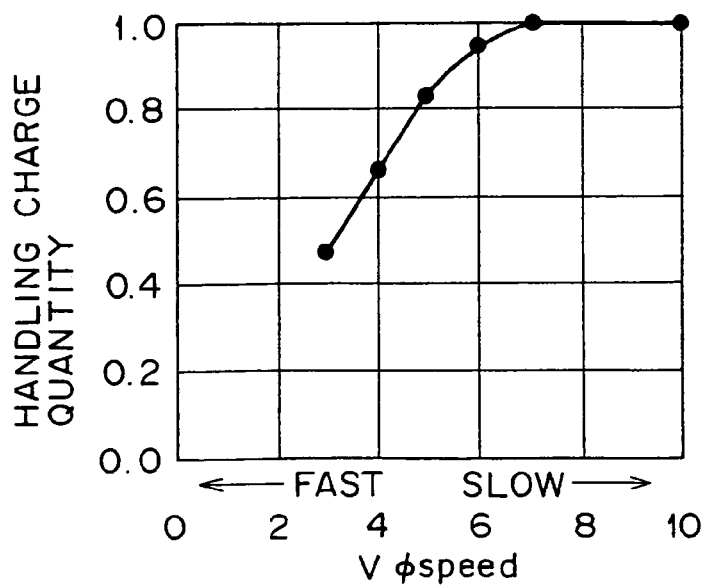
FIG. 4 shows a figure illustrating a correlation between a handling charge quantity and a transfer speed in the vertical charge transfer portion.

FIG. 4 shows a figure illustrating a correlation between the handling charge quantity and the transfer speed (Hereinafter it can be referred to as V$\phi$ speed). In the figure, a period of a certain reference clock pulse is put as 1-bit and the transfer speed is expressed with the number of bits in a sectional period, and when the number of bits is smaller (closer to zero), a faster transfer speed is expressed. From the figure, one will be able to perceive that faster is the transfer speed (shorter the transfer time per sectional period) smaller becomes the handling charge quantity.

When the handling charge quantity in the vertical charge transfer portion 2 decreases, even if a lot of signal charges are accumulated in the sensor portion 1, there is a fear that the vertical charge transfer portion 2 may become unable to transfer all the signal charges accumulated therein, and so called the left-off charges may be produced causing the deterioration of the transfer efficiency.

In the present embodiment, taking note of the fact that the handling charge quantity in the vertical charge transfer portion 2 depends on the magnitude of the charge. accumulation area in the transfer direction, or in the vertical direction, and further the magnitude of the charge accumulation area in the transfer direction depends on the number of systems of the transfer electrodes under which deep potential wells are formed, a driving method as explained in the following is adopted.

When the case where signal charges for one line are transferred in the vertical direction in eight sectional periods (from t1 through t8) using the vertical driving pulses φV1, φV2, φV3 and φV4 of 4-phase is cited as an example, among these sectional periods from t1 through t8, periods t2, t4, t6 and t8 in which the number of systems of transfer electrodes applied with vertical driving pulses of a high level becomes minimum becomes two.

When the vertical charge transfer portion 2 is driven, the sectional periods in which the vertical driving pulses become a high level and the number of systems of transfer electrodes becomes minimum are set longer than the others. To be concrete, as shown in the timing chart in FIG. 5, the sectional periods t2, t4, t6 and t8 in which the number of systems of transfer electrodes applied with vertical driving pulses of a high level becomes two are set longer than the sectional periods t1, t3, t5 and t7 in which the number of systems of transfer electrodes applied with high level driving pulses becomes three. Provided that the transfer time T, the total of eight sectional periods, is set to be the same as that in the timing chart shown in FIG. 2. In short, in comparison with the timing chart shown in FIG. 2, corresponding to the extended period of time for each sectional period of t2, t4, t6 and t8, the time for each sectional period of t1, t3, t5 and t7 is shortened.

As mentioned in the above, the sectional periods t2, t4, t6 and t8, in which the number of systems of the transfer electrodes to be applied with vertical driving pulses in a high level becomes minimum are set longer than the other sectional periods t1, t3, t5 and t7, therefore, in the sectional periods t2, t4, t6 and t8, a larger charge accumulation area in the transfer direction can be secured than that in other sectional periods.

In the sectional periods t1, t3, t5 and t7, the number of systems of transfer electrodes to be applied with vertical driving pulses in a high level becomes three, so that in consideration of the balance with the number of systems, these sectional periods are shortened in order that the magnitude of the charge accumulation area in the transfer direction is not smaller than that in the periods t2, t4, t6 and t8, which makes it possible to avoid the influence on the handling charge quantity in the vertical charge transfer portion 2.

Owing to the arrangement explained in the above, it is made possible to increase the handling charge quantity in the vertical charge transfer portion 2 without changing the total transfer time of eight sectional periods in a vertical transfer period, so that, for example, to respond to the correction of blur caused by an unintentional hand move, even if signal charges are transferred at a high speed in the vertical charge transfer portion 2, it is possible to control the decrease in the handling charge quantity to the utmost.

Figure 5:
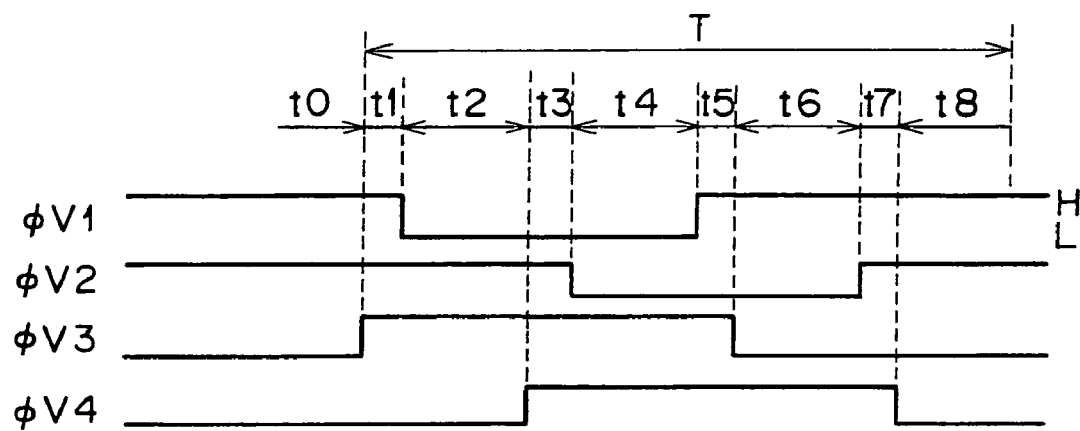
FIG. 5 shows a timing chart during a vertical transfer in the case of 4-phase drive shown in an embodiment according to the method in the present invention.
Figure 6:
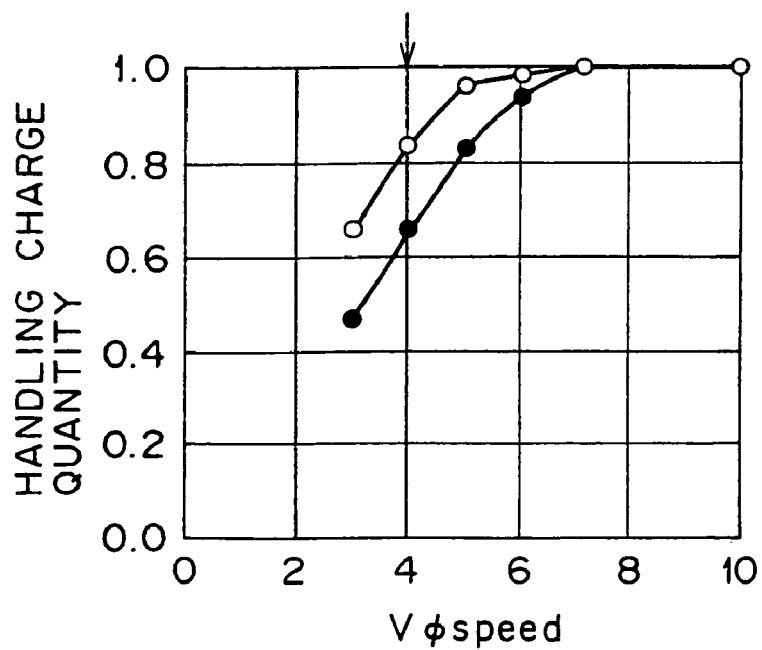
FIG. 6 shows an illustrative drawing for explaining the suppression effect for the decrease in the handling charge quantity according to the present invention.

The verification of the degree of improvement in comparing two kinds of timings were carried out by actually driving the transfer electrodes in the vertical charge transfer portion 2 using the same CCD solid-state image sensing device with the driving timing shown in FIG. 2 and the driving timing shown in FIG. 5, and the results obtained are shown in FIG. 6.

In FIG. 6, the results corresponding to the driving timing shown in FIG. 2 are shown with black circles and those corresponding to that shown in FIG. 5 are shown with white circles. About the transfer speed (Vφ speed), the extended period of time in sectional periods, t2, t4, t6 and t8 is denoted by 1-bit and the transfer time per sectional period is expressed on bit basis. It means that, for example, at the position denoted by a downward arrow indicates that 4 bits are transferred per sectional period, while in the sectional periods t2, t4, t6 and t8, the transfer time is prolonged by 1-bit.

It will be understood easily from this figure that the effect of the invention begins to appear gradually at a point where the handling charge quantity starts to decrease, and the degree of effectiveness becomes larger with the growth of the transfer speed.

What is claimed is:

1. A driving method for a solid-state image sensing device having a plurality of sensor portions arranged two-dimensionally in horizontal (row) and vertical (column) directions, a vertical charge transfer portion disposed adjacent each column of sensor portions, and a plurality of vertical transfer electrodes disposed over the vertical charge transfer portions and grouped together in the vertical direction by row for causing vertical charge transfer of signal charges contained within the vertical charge transfer portions, said method comprising the steps of:

transferring signal charges from the plurality of sensor portions to the vertical transfer registers during a sensor read out operation; and subsequently selectively applying high level driving pulses to the groups of vertical transfer electrodes in a vertical transfer period so as to transfer the signal charges in the vertical direction;

wherein the vertical transfer period is sub-divided into a plurality of sub-periods, each sub-period defined by a transition of one of the driving pulses applied to the vertical transfer electrodes, and the sub-period or sub-periods in which the number of vertical transfer electrodes in each group receiving high level driving pulses becomes minimum is/are longer than the sub-period or sub-periods in which the number of vertical transfer electrodes in each group receiving high level driving pulses is not a minimum.

2. The driving method according to claim 1, wherein the driving pulses applied to the transfer electrodes are set to only a single high level or a single low level logic value.

3. The driving method according to claim 1, wherein every other sub-period of the vertical transfer period has substantially the same time length, and an even period or periods in which the number of transfer electrodes in each group of transfer electrodes receiving high level driving pulses becomes minimum is/are longer than an odd period or periods in which the number of transfer electrodes in each group of transfer electrodes receiving high level driving pluses is not a minimum.

4. The driving method according to claim 1, wherein there are a plurality of sub-periods in each vertical transfer period in which the number of transfer electrodes in each group receiving high level driving pluses becomes minimum, and there are a plurality of sub-periods in each vertical transfer period in which the number of transfer electrodes in each group receiving high level driving-pulses is not a minimum.

5. A driving method for a charge transfer device having a charge transfer channel disposed in a charge transfer direction and a plurality of charge transfer electrodes disposed across the charge transfer channel and grouped in the charge transfer direction for transferring signal charges disposed in the charge transfer channel in the charge transfer direction, said method comprising the steps of:

selectively applying high level driving pulses to the groups of charge transfer electrodes in a charge transfer period so as to transfer the signal charges in the charge transfer direction;

wherein the charge transfer period is sub-divided into a plurality of sub-periods, each sub-period defined by a transition of one of the driving pulses applied to the charge transfer electrodes. and the sub-period or sub-periods in which the number of charge transfer electrodes in each group receiving high level driving pulses becomes minimum is/are longer than the sub-period or sub-periods in which the number of charge transfer electrodes in each group receiving high level driving pulses is not a minimum.

6. The driving method according to claim 5, wherein the driving pulses applied to the transfer electrodes are set to only a single high level or a single low level logic value.

7. The driving method according to claim 5, wherein every other sub-period of the charge transfer period has substantially the same time length, and an even period or periods in which the number of transfer electrodes in each group of transfer electrodes receiving high level driving pulses becomes minimum is/are longer than an odd period or periods in which the number of transfer electrodes in each group of transfer electrodes receiving high level driving pluses is not a minimum.

8. The driving method according to claim 5, wherein there are a plurality of sub-periods in each charge transfer period in which the number of transfer electrodes in each group receiving high level driving pluses becomes minimum, and there are a plurality of sub-periods in each charge transfer period in which the number of transfer electrodes in each group receiving high level driving pulses is not a minimum.

9. A charge transfer device having a charge transfer channel disposed in a charge transfer direction and charge transfer electrodes of a plurality of different groups disposed in the charge transfer direction for transferring signal charges disposed in the charge transfer channel in the charge transfer direction;

a charge transfer signal generation circuit that selectively applies high level driving pulses to the groups of charge transfer electrodes in a charge transfer period so as to transfer the signal charges in the charge transfer direction;

wherein the charge transfer period is sub-divided into a plurality of sub-periods, each sub-period defined by a transition of one of the driving pulses applied to the charge transfer electrodes, and the sub-period or sub-periods in which the number of charge transfer electrodes in each group receiving high level driving pulses becomes minimum is/are longer than the sub-period or sub-periods in which the number of charge transfer electrodes in each group receiving high level driving pulses is not a minimum.

10. The charge transfer device according to claim 9, wherein the driving pulses applied to the transfer electrodes are set to only a single high level or a single low level logic value.

11. The charge transfer device according to claim 9, wherein every other sub-period of the charge transfer period has substantially the same time length, and an even period or periods in which the number of transfer electrodes in each group of transfer electrodes receiving high level driving pulses becomes minimum is/are longer than an odd period or periods in which the number of transfer electrodes in each group of transfer electrodes receiving high level driving pluses is not a minimum.

12. The charge transfer device according to claim 9, wherein there are a plurality of sub-periods in each charge transfer period in which the number of transfer electrodes in each group receiving high level driving pluses becomes minimum, and there are a plurality of sub-periods in each charge transfer period in which the number of transfer electrodes in each group receiving high level driving pulses is not a minimum.

13. A method for reading out image signals comprising:

applying first through fourth vertical transfer signals to corresponding first through fourth transfer electrodes such that:

during an initial time period the signal applied to the first and second electrodes is a high logic level and the signal applied to the third and fourth electrodes is a low logic level, during a first time period the signal applied to the third electrode is made to be a high logic level;

during a second time period the signal applied to the first electrode is made to be a low logic level;

during a third time period the signal applied to the fourth electrode is made to be a high logic level;

during a fourth time period the signal applied to the second electrode is made to be a low logic level;

during a fifth time period the signal applied to the first electrode is made to be a high logic level;

during a sixth time period the signal applied to the third electrode is made to be a low logic level;

during a seventh time period the signal applied to the second electrode is made to be a high logic level;

during an eighth time period the signal applied to the fourth electrode is made to be a low logic level; and wherein the second, fourth, sixth and eighth time periods are longer than the first, third, fifth and seventh time periods.

14. The method for reading out image signals according to claim 13, further wherein the second, fourth, sixth and eighth time periods have substantially the same time length, and the first, third, fifth and seventh time periods have substantially the same time length.

15. A charge transfer device for reading out image signal comprising:

first through fourth vertical transfer electrodes;

wherein first through fourth vertical transfer signals are applied to said first through fourth vertical transfer electrodes such that;

the signal applied to the first and second electrodes during an initial time period is a high logic level and the signal applied to the third and fourth electrodes during an initial time period is a low logic level, the signal applied to the third electrode during a first time period is made to be a high logic level;

the signal applied to the first electrode during a second time period is made to be a low logic level;

the signal applied to the fourth electrode during a third time period is made to be a high logic level;

the signal applied to the second electrode during a fourth time period is made to be a low logic level;

the signal applied to the first electrode during a fifth time period is made to be a high logic level;

the signal applied to the third electrode during a sixth time period is made to be a low logic level;

the signal applied to the second electrode during a seventh time period is made to be a high logic level;

the signal applied to the fourth electrode during an eighth time period is made to be a low logic level; and wherein the second, fourth, sixth and eighth time periods are longer than the first, third, fifth and seventh time periods.

16. The charge transfer device for reading out image signals according to claim 15, further wherein the second, fourth, sixth and eighth time periods have substantially the same time length, and the first, third, fifth and seventh time periods have substantially the same time length.

17. A solid-state image sensing device including:
a plurality of sensor portions arranged two-dimensionally in horizontal (row) and vertical (column) directions, a vertical charge transfer portion disposed adjacent each column of sensor portions, and a plurality of transfer electrodes disposed across the vertical charge transfer portions and grouped together in the vertical direction,
a read-out circuit for transferring signal charges from the plurality of sensor portions to the vertical transfer registers during a sensor read out operation; and
a charge transfer signal generation circuit that selectively applies high level driving pulses to the groups of transfer electrodes in a vertical transfer period so as to transfer the signal charges in the vertical direction;
wherein the vertical transfer period is sub-divided into a plurality of sub-periods, each sub-period defined by a transition of one of the driving pulses applied to the transfer electrodes, and the sub-period or sub-periods in which the number of transfer electrodes in each group receiving high level driving pulses becomes minimum, is/are longer than the sub-period or sub-periods in which the number of transfer electrodes in each group receiving high level driving pulses is not a minimum.

18. The solid-state image sensing device according to claim 17, wherein the driving pulses applied to the transfer electrodes are set to only a single high level or a single low level logic value.

19. The solid-state image sensing device according to claim 17, wherein every other sub-period of the vertical transfer period has substantially the same time length, and an even period or periods in which the number of transfer electrodes in each group of transfer electrodes receiving high level driving pulses becomes minimum is/are longer than an odd period or periods in which the number of transfer electrodes in each group of transfer electrodes receiving high level driving pluses is not a minimum.

20. The solid-state image sensing device according to claim 17, wherein there are a plurality of sub-periods in each vertical transfer period in which the number of transfer electrodes in each group receiving high level driving pluses becomes minimum, and there are a plurality of sub-periods in each vertical transfer period in which the number of transfer electrodes in each group receiving high level driving pulses is not a minimum.

* * * * *